United States Patent Office 3,356,653
Patented Dec. 5, 1967

3,356,653
COPOLYMERS CONTAINING HETEROCYCLIC UNSATURATED AMINO ALCOHOLS
Kazys Sekmakas, Chicago, Ill., assignor to De Soto, Inc., a corporation of Delaware
No Drawing. Filed Nov. 3, 1965, Ser. No. 506,273
6 Claims. (Cl. 260—78.5)

This invention relates to new hydroxy derivatives of certain unsaturated amino acids and the production thereof as well as copolymers containing the same. The invention especially contemplates film forming aqueous emulsions of copolymerized ethylenically unsaturated materials, which emulsion deposit films which exhibit good adhesion to glossy or chalky surfaces and improved adhesion to surfaces previously coated with oil based paints, as improved water resistance. More particularly, the present invention contemplates copolymer emulsions of fine particle size in which the dispersed particles of the emulsion are constituted by particles of emulsion copolymers of monoethylenically unsaturated materials, which contain an hydroxy derivative of certain unsaturated amino acids in combination with other monoethylenic materials providing oxirane functionality.

Aqueous emulsion or latex paints are presently in wide use since they are inexpensive, apply easily with water cleanup application, and the coatings dry rapidly with minimum odor. Unfortunately, and as is known, latex paints are subject to important disadvantages which have limited their utility and detracted from their potential value. Thus, available latex paints do not adequately adhere to previously painted surfaces which are glossy or chalky. Also, the deposited films lack desirable water resistant properties and the films do not adequately adhere to surfaces previously painted with oil based paints. When alkyd resins are used in combination to improve adhesion, water resistance is further impaired.

In accordance with the present invention, these disadvantages are overcome by employing aqueous emulsion copolymers or interpolymers of polymerizable monoethylenically unsaturated materials which include a small proportion of hydroxy derivatives of certain unsaturated amino acids. The presence of these hydroxy derivatives in combination with the presence of the oxirane group markedly alters the character of the aqueous emulsion copolymer to provide emulsion coating systems which exhibit good adhesion to glossy or chalky surfaces and improved adhesion to surfaces painted with oil based paints. Also, and despite water application, the deposited films resist water well even when alkyl resins are used to upgrade adhesion to chalked surfaces.

The term aqueous emulsion copolymer is used to denote copolymers or interpolymers produced by copolymerizing a liquid mixture of polymerizable monomers dispersed in aqueous medium in the form of finely divided particles of sufficient fineness (up to about 3 microns) to be stably dispersed in water. As is known, aqueous emulsion copolymers are of very high molecular weight and the emulsion copolymer feature of the invention is in no way related to copolymers of far lower molecular weight which may be produced by other polymerization techniques, such as suspension polymerization which produces polymer particles which are not stably suspended, solution polymerization or polymerization in bulk. Indeed, such copolymers are useless in the emulsions contemplated by the invention, though solution copolymers provide another and different feature of the invention.

First, the invention is based on the finding that valuable new polyfunctional monomers may be provided by reacting an alkylene mono-oxide with a monoethylenically unsaturated carboxy-functional derivative of ethylene urea or the like which retains amine functionality. In this respect, the invention will be illustrated particularly by the reaction of hydroxyethyl ethylene urea and maleic anhydride.

In the reaction of the hydroxy derivative of ethylene urea and the like with maleic anhydride or other dicarboxylic acid anhydride, the anhydride group reacts with the hydroxy group of the ethylene urea derivative in order to provide a monomeric product which retains one of the carboxyl functionalities of the anhydride and the amine functionality of the ethylene urea derivative. This reaction is more fully described in United States Patent 3,194,792, the disclosure of which is hereby incorporated by reference.

In accordance with the present development, it has been found that the unsaturated amino acid of the prior art can be reacted with alkylene mono-oxide to form an ethylenically unsaturated copolymerizable monomeric amino alcohol despite the fact that it is also known that amines are reactive with oxirane functionality.

The products of the above reaction have the following formula where $R_1$ is a ($C_2$–$C_3$)-alkylene group;
A is a ($C_2$–$C_3$)-alkylene group; and
$R_2$ is an alkylene group containing from 2–8 carbon atoms or a halogen-substitution product thereof.

The preferred products have the following formula:

in which $R_2$ is an alkylene radical selected from the group consisting of ethylene, 1,2-propylene and 1,2-butylene radicals.

Apparently, and especially in the presence of an alkaline catalyst typically illustrated by benzyl trimethyl ammonium chloride, the alkylene oxide reacts with the carboxyl group and not with the amino group of the ethylene urea derivative so that the amine functionality is retained and the product is essentially monomeric. While alkaline catalysis of the reaction is not essential, since the amino group on the amino acid provides sufficient basicity to carry out the process in the absence of alkaline catalysis, the reaction is made more rapid by the presence of alkaline catalysts. While benzyl trimethyl ammonium chloride is a particularly preferred catalyst, any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine tripropyl amine and tributyl amine are particularly preferred amines.

The alkaline catalyst is conveniently present in an amount of from 0.1–1.0% by weight, based on the weight of the amino acid reactant.

The alkylene oxide reactant may be any monoethylenically unsaturated olefin containing from 2–8 carbon atoms, preferably from 2–4 carbon atoms, and more preferably containing the single ethylenic group in a terminal position, as well as halogen-substituted derivatives thereof. Particularly preferred are ethylene oxide, propylene oxide and 1,2-butylene oxide. Halogen-substituted derivatives are illustrated by epichlorohydrin, epiiodohydrin, epifluorohydrin and epibromohydrin. The preferred halogenated epoxide is epichlorohydrin. Other halogenated epoxides which may be used are illustrated by trichloromethylethylene oxide, alpha-methyl epichlorohydrin, beta-heptylepichlorohydrin, alpha-cyclohexylepichlorohydrin and beta-phenylepibromohydrin.

While numerous monoethylenically unsaturated carboxylic acid amines are disclosed in United States Patent 3,194,792, and while the invention accommodates all of the products of this character referred to in said patent, it is particularly preferred to use the hydroxyethyl derivative of ethylene urea which is conveniently produced by reacting equimolar proportions of urea with aminoethyl ethanol amine. Again, and while monoethylenically unsaturated dicarboxylic acid anhydrides are available for coreaction with the cyclic hydroxy amine product, maleic anhydride is particularly preferred, the hydroxy derivative of ethylene urea being reacted with maleic anhydride in equimolar proportions to form the unsaturated carboxylic acid amine.

While the present invention includes the new hydroxy amine derivatives which have been produced and the production thereof as well as polymers and copolymers of from 0.1–20% by weight of this polyfunctional product with the balance of the addition polymer being other ethylenically unsaturated material copolymerizable therewith, especially monomers containing the $CH_2=C<$ group such as methyl methacrylate, ethyl acrylate, butyl acrylate, styrene, vinyl toluene, acrylonitrile and the like, an important feature of the invention is certain emulsion copolymers or interpolymers with oxirane-containing monomers having important new properties.

Referring first to the broad area of copolymers which may be produced in accordance with the present invention, the unsaturated hydroxy amines which are produced in accordance with the invention are copolymerized with numerous other ethylenically unsaturated materials to form copolymers in which both the amine and the hydroxy functionality of the unsaturated hydroxy amine derivatives of the invention can be relied upon to provide thermosetting properties. This is especially true when the copolymer is a solution copolymer and includes other copolymerized materials providing reactive groups as are provided by hydroxy-containing ethylenic monomers or oxirane-containing ethylenic monomers. In these copolymers the unsaturated hydroxy-amine derivatives of the invention are desirably present in an amount of from 0.5% to 20% by weight, more preferably from 2–15% by weight. The hydroxy functional monomers are desirably present in an amount of from 2–30% by weight, preferably from 4–15% by weight. The oxirane-functional monomers are desirably present in an amount of from 0.5–20% by weight, preferably from 2–15% by weight.

The preferred hydroxy-functional monomers are illustrated by 2-hydroxy ethyl and 2-hydroxy propyl acrylate and methacrylate, though these are merely illustrative of the class which also includes other hydroxy alkyl methacrylates and acrylates such as 3-hydroxy propyl methacrylate, 4-hydroxy butyl methacrylate and the corresponding acrylates. Still further hydroxy-containing monomers which may be used are ethylene glycol allyl ether, propylene glycol allyl ether, butylene glycol allyl ether, diethylene glycol allyl ether, trimethylol propane allyl ether and 2-hydroxy-methyl-5-norbornene (either the endo isomer or the exo isomer or mixtures thereof). Still further, allyl alcohol, methyllyl alcohol, crotyl alcohol and unsaturated fatty alcohols corresponding to drying oil fatty acids may be used.

The oxirane-containing monomers which may be used to provide thermosetting properties to the solution copolymers which are contemplated are the same as those which are used in the emulsion copolymers referred to hereinafter.

With respect to the aqueous emulsion interpolymers, these are formulated to include from 0.1–5% by weight, based on the total weight of copolymerizable material, of the unsaturated hydroxy amine product referred to. While 5% is a preferred maximum, up to 15% of the hydroxy amine product may be tolerated, though this is wasteful.

The oxirane containing monoethylenically unsaturated material is a monomeric compound preferably illustrated by glycidyl acrylate or glycidyl methacrylate and mixture thereof, though other monomers such as allyl glycidyl ether, glycidyl vinyl ether, and dipentene mono-oxide may also be used. The oxirane containing material is used in small amounts and preferably in proportions of about 0.2–5% by weight, based on the total weight of copolymerizable material, though as little as 0.1% has some effect and about 15% may be tolerated. The oxirane material functions to provide, in combination with the amino alcohol, the superior water resistance, wet adherence and adherence to glossy and oil painted surfaces which are the objectives of the invention. It is particularly preferred that the oxirane material be ammoniated or aminated. More preferably, the oxirane containing material is used in proportions of from 1–3% by weight.

The oxirane groups of the copolymer are preferably reacted with aminating and/or ammoniating agents to form the emulsion copolymers of the present invention. Apparently, the aminating and/or ammoniating agents react with the oxirane ring to cause the same to open, a hydrogen atom from the aminating or ammoniating agent combining with the oxygen atom to form an hydroxyl group, and the residue of the agent is directly attached to the remaining carbon atom of the oxirane ring.

The remainder of the emulsion copolymer consists essentially of at least one other monoethylenically unsaturated monomer, preferably one having no functional group other than the $CH_2=C<$ group. The numerous materials which may be used either alone or in mixtures are illustrated by methyl acrylate, ethyl acrylate, methyl methacrylate, butyl acrylate, styrene, 2-ethylhexyl acrylate, vinyl toluene, vinyl acetate, acrylonitrile, vinylidene chloride, etc. Small proportions, up to 5% by weight, of materials having a functional group other than the ethylenic group such as acrylic acid, acrylamide, methylol acrylamide, aminoacrylates or hydroxyethyl acrylate may also be present but, and with the exception of up to about 5% of unsaturated acid, monomers supplying other functional groups should be limited to amounts less than 3% by weight.

It is preferred that the monomers be selected to provide a copolymer having a glass transition temperature below room temperature so that the copolymer particles will coalesce by themselves without the necessity of applying external heat. However, the monomers can be selected to provide a copolymer having a higher glass transition temperature and higher boiling water miscible solvents may be used as taught in Sanderson Patent 3,032,521. Water immiscible solvents, such as butyl Cellosolve acetate, can also be used.

While the present invention primarily contemplates aqueous emulsions which will provide flat-appearing coatings, a degree of surface gloss may be provided as taught in my copending application Ser. No. 440,628, filed Mar. 17, 1965.

The emulsion copolymers of unsaturated amino hydroxy adduct, monoethylenically unsaturated monomers and oxirane containing unsaturated monomers are preferably copolymerized using a procedure which will produce fine particle size emulsions. Preferred particle size is from .05 to 1 micron, though from .01 to 3 microns is broadly contemplated. These fine particle size latex emulsions are prepared by incrementally adding the unsaturated copolymerizable material to a water solution which has dispersed therein surface active agents. The addition is made under conditions conductive to addition copolymerization so that copolymerization takes place as the materials are added thus allowing for the formation of fine particle size emulsions. To allow copolymerization to take place as the unsaturated copolymerizable materials are added to the emulsion, it is desirable that polymerization catalyst be present in the water phase of the emulsion as the unsaturated copolymerizable materials are added thereto. It is understood that this is not essential though it is preferred, and that the polymerization catalyst can be in admixture with the unsaturated copolymerizable materials as they are added to the emulsion or the catalyst can be added to the water phase as polymerization proceeds.

The polymerization catalysts which may be used in accordance with the invention can be of the water soluble type such as potassium persulfate, ammonium persulfate and hydrogen peroxide, or of the monomer soluble, water-insoluble type such as benzoyl peroxide, cumene hydroperoxide and methyl ketone peroxide as desired. Preferably, the water-soluble catalysts are used as the monomer soluble type tend to produce large particle size emulsions. A combination of the water-soluble and monomer soluble catalysts may also be used.

When the polymerization catalysts of the persulfate type are used, they decompose resulting in acidic products. It is preferred to buffer the system to maintain the pH in the range of from 4.0–6.0 during polymerization with materials such as sodium bicarbonate, etc.

Emulsification is maintained with an anionic surface active agent, preferably in combination with a non-ionic surface active agent. In the examples set forth hereinafter, the anionic agent is sodium lauryl sulfate and the non-ionic agent is nonyl phenyl polyethylene glycol ether containing about 10 ethylene oxide groups per molecule. While these specific agents are preferred, other anionic agents are illustrated by sodium dioctyl sulfosuccinate and sodium octylphenoxy polypropylene oxide sulfonate containing about 20 propylene oxide groups per molecule. Appropriate anionic commercial compositions are Triton X-200 and Duponol ME. Other non-ionic agents are illustrated by octyl phenoxy polyoxypropylene ethanol. Appropriate non-ionic commercial compositions are Triton X-100, Igepal CO-630, Tergitol NPX and Tergitol NP-14. The anionic surface active agent when used alone is preferably added in amounts of from 0.5% to 3% by weight, based on the total weight of the emulsion product produced in accordance with the invention. When the anionic surface active agent is used in combination with the non-ionic surface active agent, it is preferably added in amounts of from 0.5% to 2% by weight. The non-ionic surface active agent is preferably used in amounts of from 1% to 4% by weight.

The emulsion copolymer of the present invention preferably contains ammoniated oxirane groups, aminated oxirane groups or both. This ammoniation or amination reaction provides an emulsion coating composition which exhibits the improved properties discussed hereinbefore.

The amination or ammoniation reaction is preferably conducted after copolymerization, though less desirably the oxirane containing material may be aminated or ammoniated prior to copolymerization.

The agents which may be used in the ammoniating or aminating reaction are preferably ammonium hydroxide or simple aliphatic primary and secondary monoamines such as 1 to 4 carbon atom alkyl and alkanol amines such as monoethanol amine. Both agents are preferably used in water solution. Ammonium hydroxide is particularly preferred because it is relatively inexpensive. Ammonia may also be used but this is less desirable. Other monoamines which may also be used are illustrated by tertiary butyl amine, ethyl amine, tertiary octyl amine, diethanolamine, dimethyl amine, methyl ethyl amine, etc. While mixtures of these agents may be used, it is preferred to use one for ease of production.

As would be evident, the ammoniating reaction with ammonium hydroxide is preferably conducted at room temperature so as not to cause extensive generation of ammonia.

The ammoniating and aminating agents are preferably used in sufficient proportion to cause ammoniation or amination of substantially all the oxirane groups carried by the oxirane containing material.

The invention is illustrated in the examples which follow in which all parts are by weight.

EXAMPLE 1

*Preparation of ethylenically unsaturated amino alcohol*

| Grams | | |
|---|---|---|
| 729 (7 moles) | Aminoethyl ethanolamine. | Heat to 240°–250° F. in 1½ hours. Hold for 1 hour. Then increase temperature to 390–400° F. in 2 hours. Hold for 2 hours. (Theoretical NH₃, 238 grams. Actual loss, 243 grams.) |
| 420 (7 moles) | Urea | |
| 686 (7 moles) | Maleic anhydride. | Add. Heat to 250° F. Hold for 1 hour to provide an acid value of 190. |
| 390 | Butyl alcohol | Add. |
| 7.8 | Benzyl trimethyl ammomium chloride (60% solution in water). | Add. |
| 550 | Propylene oxide | Add propylene oxide over 2–2½ hours at 235–240° F. Hold for acid value less than 5. |

The final characteristics of the product are:

Solids _____ percent __ 80.5
Viscosity (Gardner-Holdt) _____ W
Acid value _____ 3.9

EXAMPLE 2

*Preparation of emulsion polymer*

| Grams | "A" | |
|---|---|---|
| 540 | Water | With nitrogen blanket, heat to 170° F. using agitation. |
| 1 | Sodium bicarbonate | |
| 3 | Potassium persulfate | |
| | "B" | |
| 200 | Water | Dissolve surfactants in 200 grams of water. Add water-emulsifier Solution "B" to the monomer blend "C" using fast speed agitation. |
| 8 | Sodium lauryl sulfate | |
| 24 | Nonylphenoxy polethylene ethanol. | |
| | "C" | |
| 640 | Ethyl acrylate | |
| 310 | Methyl methacrylate | |
| 20 | Glycidyl methacrylate | |
| 25 | Product of Example 1 | |
| 10 | Glacial-methacrylic acid | |
| | "D" | |
| 340 | Water | Then add water "D" using fast speed agitation. Add ingredients B+C+D to reactor (ingredients A) over 2½ hours at 170–175° F. Cool to 90° F. Add to emulsion to adjust pH to 9.5–10.0 using agitation. Strain through cheesecloth. |
| 25 | Ammonium hydroxide (29%). | |
| 30 | Water | |

The final characteristics of the emulsion polymer are:

Solids, percent _____ 46.7
Viscosity (#4 spindle at 40 r.p.m. Brookfield), cps. _ 36
pH _____ 9.9

EXAMPLE 3

*Preparation of ethylenically unsaturated amino alcohol*

| Grams | | |
|---|---|---|
| 729 (7 moles) | Aminoethyl ethanolamine | Heat to 240–250° F. in 1–1½ hours. Hold for 1 hour. Then increase temperature to 390–400° F. in 2 hours. Hold for 2 hours. (Theoretical loss of NH₃, 238 gr. Actual loss, 243 gr.) |
| 420 (7 moles) | Urea | |
| 686 (7 moles) | Maleic anhydride | Add. Heat to 250° F. Hold for 1 hour to provide an acid value of 190. |
| 390 | Butyl alcohol | Add. |
| 7.8 | Benzyl trimethyl ammonium chloride (60% solution in water). | Add. |
| 575 | Butylene oxide | Add butylene oxide over 2–2½ hours at 235–240° F. Hold for acid value less than 5. |

The final characteristics of the product are:

Solids _____percent__ 74
Viscosity (Gardner-Holdt) _____ U–V
Acid value _____ 4.1

EXAMPLE 4

*Preparation of emulsion polymer*

| Grams | "A" | |
|---|---|---|
| 540 | Water | With nitrogen blanket, heat to 170° F. using agitation. |
| 1 | Sodium bicarbonate | |
| 3 | Potassium persulfate | |
| | "B" | |
| 200 | Water | Dissolve surfactants in 200 grams of water. Add water-emulsifier Solution "B" to the monomer blend "C" using fast speed agitation. |
| 8 | Sodium lauryl sulfate | |
| 24 | Nonylphenoxy polyethylene ethanol. | |
| | "C" | |
| 640 | Ethyl Acrylate | |
| 310 | Methyl methacrylate | |
| 20 | Glycidyl methacrylate | |
| 25 | Product of Example 3 | |
| 10 | Glacial-methacrylic acid | |
| | "D" | |
| 340 | Water | Then add water "D" using fast speed agitation. Add ingredients B+C+D to reactor (ingredients A) over 2½ hours at 170–175° F. Hold for one hour at 175° F. Cool to 90° F. Add to emulsion to adjust pH to 9.5–10.0 using agitation. Strain through cheesecloth. |
| 25 | Ammonium hydroxide (29%). | |
| 30 | Water | |

The final characteristics of the emulsion polymer are:

Solids, percent _____ 47.2
Viscosity (#4 spindle at 50 r.p.m. Brookfield), cps. __ 28
pH _____ 9.7

EXAMPLE 5

*Polymer containing unsaturated hydroxy amine*

| Grams | | |
|---|---|---|
| 200 | 2-ethoxy ethanol | Charge into reactor. Heat to 210° F. |
| 180 | Product of Example 1 | |
| 200 | 2-ethoxy ethanol | Premix monomers and add over 2½ hours to reactor at 200–210° F. Hold for 2 hours. |
| 195 | Ethyl acrylate | |
| 30 | Glycidyl methacrylate | |
| 30 | Acrylic acid | |
| 60 | Styrene | |
| 10 | Benzoyl peroxide | |
| 5 | Tertiary dodecyl mercaptan | |
| 2 | Benzoyl peroxide | Add: Hold for 2 hours. Cool to room temperature. |

The final characteristics of the solution polymer are:

Solids _____percent__ 48.1
Viscosity (Gardner-Holdt) _____ V–W
Color (Gardner) _____ 6

A film of this interpolymer is baked 10 minutes at 350° F. on tin panel (film thickness—1 mil.). The film has xylol resistance, is very flexible, and adherent.

EXAMPLE 6

Example 5 is repeated replacing the glycidyl methacrylate component with an equal weight of hydroxyethyl acrylate. Again, a film of the polymer baked on tinplate under the same conditions possesses excellent xylol resistance and is very flexible and adherent.

EXAMPLE 7

*Preparation of polyester emulsion for improved wetting of chalky substrate*

An oily polyester which is used for improved adhesion to chalky surfaces is produced by charging to a kettle 8,800 pounds of linseed fatty acids, 720 pounds of a styrene-allyl alcohol resinous polyol (see note 1) and 30 gallons of xylol.

The mixture is heated slowly with agitation using a nitrogen sparge until the resinous polyol has melted, whereupon the rate of agitation and heating are increased to raise the temperature to 480° F. 120 pounds of pentaerythritol are added when the mixture is at 300° F. and while the mixture is being rapidly heated with vigorous agitation. The mixture is held at 480° F. for an acid value of 20, whereupon the xylol is stripped away with continued cooking. When the acid value reaches 16, the product is rapidly cooled with water to 350° F. and filtered to provide a product having the following characteristics:

Solids _____percent__ 98
Viscosity (Gardner-Holdt) _____ Z₅–Z₇
Acid value _____ 14–16
Color (Gardner) _____ 6

*Note 1.*—The resinous polyol is a copolymer of styrene and allyl alcohol having an average molecular weight of 1600, a softening temperature (ASTM E28–517) of 95–105° C. and an available hydroxy content of from 5.4 to 6.0% measured by a modified acetic anhydride test (see Ind. Eng. Chem. Anal. Edition, 17, 394–7 (1945)).

45 gallons of the oily polyester of the present example are mixed with 1.25 gallons of a 28% aqueous solution of ammonium hydroxide and the mixture has added to it slowly over a 1½ hour period, 38 gallons of water. Stirring is continued for an additional ½ hour after which 14 additional gallons of water are added slowly over a 1 hour period with continued agitation. At this point, 1 gallon of ethylene glycol is added together with a gallon of a foam control agent, the latter being optional. The final emulsion has a solids content of 44.1%, a pH of 9.7, a #4 Ford Cup viscosity of 13–15 seconds and the emulsion has an average particle size range of from 0.5–3.0 microns.

It is quite common for oil based house paints such as linseed oil house paints to be heavily pigmented with zinc oxide pigment and such paints deposit films which become chalky upon exposure and are quite difficult to repaint with latex paint. Accordingly, it is common to modify an acrylic latex paint by blending 75 parts by weight of the acrylic emulsion with 25 parts of an emulsion of an oily polyester. The foregoing example shows the production of a typical oily polyester emulsion useful as indicated and the 75/25 blending noted above with the polyester of Example 7 is denoted hereinafter by the language "Modified With Polyester Emulsion."

As will be evident from the materials which follow, the new emulsions of the invention are unique in retaining excellent wet adhesion properties even when modified with alkyd emulsions in order to provide improved wetting of chalky surfaces.

There is submitted in Table I hereinafter an indication of the properties of the emulsion interpolymers produced in accordance with the invention in comparison with other similar emulsions. Numerous interpolymers are evaluated, all of these having the composition of Example 2 and being produced as described in Example 2 with the exception of the proportion of unsaturated amino alcohol used and the proportion of glycidyl methacrylate used, each of which are identified in the table.

TABLE I

In the tests, wooden trim panels are painted with a standard zinc oxide pigmented linseed oil exterior house paint, and the painted panels are exposed to the weather for nine months, rendering them chalky and difficult to overcoat with emulsion paints. The panels are then wiped with a dry rag to remove surface dirt and the like and are then repainted with the emulsions under test.

The repainted panels are then submerged in water for 18 hours, and the wet panels are frozen in a freezer to below the freezing point of water and then thawed to room temperature to provide a single test cycle. This test cycle is then repeated several times and adhesion is measured after each cycle by rubbing the coating vigorously with the finger to determine whether the paint comes off the panels.

In the table, the overall ratings of the coatings are numerically evaluated as follows:

Poor _____ 0–25
Fair _____ 25–50
Good _____ 50–75
Very good _____ 75–85
Excellent _____ over 85

| Emulsion Composition | A | B | C | D | E | F | G | X |
|---|---|---|---|---|---|---|---|---|
| Glycidyl Methacrylate, percent | 0 | 1 | 2 | 0 | 2 | 1 | 3 | ---- |
| Hydroxyl Amine, percent | 0 | 1 | 0 | 2 | 2 | 3 | 1 | ---- |
| Wet Adhesion Properties: | | | | | | | | |
| Unmodified | 9 | 28 | 84 | 24 | 90+ | 90+ | 90+ | 18 |
| Modified with Polyester Emulsion | 9 | 9 | 22 | 30 | 36 | 90 | 90+ | 9 |
| Tensile Strength, p.s.i., Unmodified | 577 | 624 | 677 | 634 | 590 | 637 | 647 | 504 |
| Percent Elongation, Unmodified | 252 | 95 | 52 | 190 | 48 | 85 | 40 | 162 |

In connection with the above evaluation of the present invention, comparison has been made with the best available competitive emulsion material known to me, and which is identified by the letter X. The chemical constitution of this competitive material is not specifically known to me.

As will be evident from the table, the presence of both the oxirane-containing compound and the hydroxyl amine compound of the invention are required in order to provide significant superiority. Tensile strength data and elongation data are included for the unmodified material so that the wet adhesion properties can be viewed in the light of the physical properties which are obtained.

The presence of functional groups markedly alters the characteristics of the emulsion interpolymer. By regulating the type and amount of functional group, some unusual properties can be built into the emulsion interpolymer. When the degree of cross-linking between the glycidyl acrylate and hydroxy amine is varied, the wet adhesion properties, tensile strength and elongation can be changed to a great extent. The emulsions of interpolymers containing multi-functional reactivity retain good emulsion stability and, despite the fact that hydroxy amines are water soluble monomers, the resulting emulsion interpolymers are water insoluble and, indeed, produce air dried films which possess excellent water resistance.

The invention is defined in the claims which follow.

I claim:

1. A solution copolymer comprising from 0.5 to 20% by weight of the copolymer of at least one compound of the formula

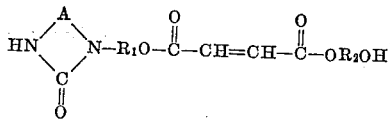

where:

$R_1$ is a $(C_2-C_3)$-alkylene group;
A is a $(C_2-C_3)$-alkylene group; and
$R_2$ is an alkylene group containing from 2–8 carbon atoms or a halogen-substitution product thereof, at least one copolymerizable monomer containing a single $CH_2=C<$ and carrying a functional group selected from the group consisting of hydroxy functionality and oxirane functionality, and at least one further copolymerizable monomer containing a single $CH_2=C<$ group.

2. An aqueous emulsion copolymer consisting essentially of from 0.1 to 15% by weight of the copolymer of at least one compound of the formula

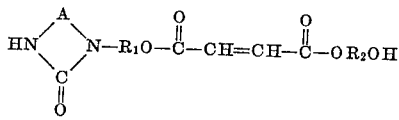

where:

$R_1$ is a $(C_2-C_3)$-alkylene group;
A is a $(C_2-C_3)$-alkylene group; and
$R_2$ is an alkylene group containing from 2–8 carbon atoms or a halogen-substitution product thereof, and at least one copolymerizable monomer containing a single $CH_2=C<$ group and copolymerizable with said compound in aqueous emulsion.

3. An aqueous emulsion copolymer consisting essentially of from 0.1 to 5% by weight of the copolymer of at least one compound of the formula

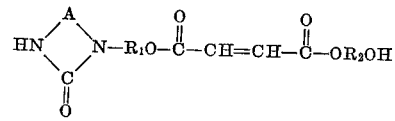

where:

$R_1$ is a $(C_2-C_3)$-alkylene group;
A is a $(C_2-C_3)$-alkylene group; and
$R_2$ is an alkylene group containing from 2–8 carbon atoms or a halogen-substitution product thereof, from 0.1 to 5% by weight of the copolymer of at least one monoethylenically unsaturated compound supplying oxirane functionality to said copolymer and at least one copolymerizable monomer containing a single $CH_2=C<$ group and copolymerizable with said compound in aqueous emulsion.

4. The copolymer of claim 2 in which said copolymer is reacted with ammonia or a volatile amine.

5. The copolymer of claim 3 in which the copolymer includes a monoethylenically unsaturated carboxylic acid in an amount up to 5% by weight of the copolymer and the copolymer is reacted with ammonia or a volatile amine.

6. The copolymer of claim 2 in which said compound has the formula
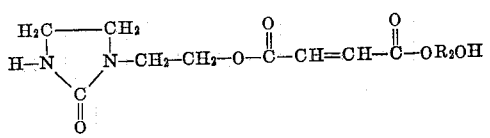
in which $R_2$ is an alkylene radical selected from the group consisting of ethylene, 1,2-propylene and 1,2-butylene radicals.
References Cited
UNITED STATES PATENTS
3,194,792   7/1965   Emmons et al. ------ 260—78.5
SAMUEL H. BLECH, *Primary Examiner.*
MURRAY TILLMAN, *Examiner.*
W. J. BRIGGS, *Assistant Examiner.*